(12) United States Patent
Fukui

(10) Patent No.: US 6,885,177 B2
(45) Date of Patent: Apr. 26, 2005

(54) SWITCHING REGULATOR AND SLOPE CORRECTING CIRCUIT

(75) Inventor: Atsuo Fukui, Chiba (JP)

(73) Assignee: Seiko Instruments Inc., Chiba (JP)

( * ) Notice: Subject to any disclaimer, the term of this patent is extended or adjusted under 35 U.S.C. 154(b) by 69 days.

(21) Appl. No.: 10/626,449

(22) Filed: Jul. 24, 2003

(65) Prior Publication Data

US 2004/0135567 A1 Jul. 15, 2004

(30) Foreign Application Priority Data

Aug. 12, 2002 (JP) ........................................ 2002-234388

(51) Int. Cl.[7] ................................................ G05F 1/40
(52) U.S. Cl. ........................ 323/288; 323/242; 323/280
(58) Field of Search ................................. 323/280, 281, 323/283, 284, 288, 290, 242, 315, 316

(56) References Cited

U.S. PATENT DOCUMENTS 6,177,787 B1 * 1/2001 Hobrecht ..................... 323/283
6,650,092 B1 * 11/2003 Lidak et al. .................. 323/222
6,744,241 B2 * 6/2004 Feldtkeller ................... 323/288

* cited by examiner

Primary Examiner—Jessica Han
(74) Attorney, Agent, or Firm—Adams & Wilks

(57) ABSTRACT

A switching regulator has an input terminal for receiving an input voltage, an output terminal for outputting an output voltage, a coil connected between the input terminal and the output terminal, and a slope correcting circuit for outputting a signal adapted to carry out slope correction for preventing current oscillation. An error amplifier compares one of the output voltage and a voltage division value of the output voltage with a reference voltage to output a signal, and a switch controls the output voltage with a signal generated using results obtained by arithmetically operating the output signal of the slope correcting circuit and the output signal of the error amplifier. The slope correcting circuit outputs a signal obtained by adjusting the signal adapted to carry out the slope correction in correspondence to the output voltage.

4 Claims, 2 Drawing Sheets

SWITCHING REGULATOR AND SLOPE CORRECTING CIRCUIT

BACKGROUND OF THE INVENTION

1. Field of the Invention

The present invention relates to a switching regulator for following an output voltage to change an amount of slope correction.

2. Related Background Art

As for a conventional current mode step-down switching regulator, for example, a circuit having a configuration as shown in the form of a block diagram in FIG. 3 is known.

A switch 107 serves to supply therethrough an input voltage VIN to a coil 109. An error amplifier 101 serves to amplify a difference between a voltage which is obtained by dividing an output voltage VOUT with resistors 110 and 111, and a reference voltage VREF supplied from a reference voltage source 100.

A signal which is obtained by subtracting a correction ramp wave outputted from a slope correcting circuit 102 from an output signal of the error amplifier 101 in a subtracter 103 is inputted to an inverting input terminal of a comparator 104. The correction ramp wave outputted from the slope correcting circuit 102, as shown in the figure, has a shape of a saw-tooth-wave which is synchronous with a period of an oscillator 105.

A voltage signal into which information of a current caused to flow through the switch 107, or information of a current caused to flow through the coil 109 is converted is inputted to a non-inverting input terminal of the comparator 104. A current caused to flow through the respective constituent elements is usually detected using a sense resistor which is operatively connected in series with the switch 107 or the coil 109. Thus, a voltage signal having a value which is proportional to the current caused to flow through the switch 107 or the coil 109 is inputted as voltage information to the non-inverting input terminal of the comparator 104.

A level of an output signal of the error amplifier 101 is increased when a level of the output voltage VOUT is low. Thus, in order to make transition of a level of an output signal of the comparator 104 from L to H, a voltage signal having a larger value needs to be applied to the non-inverting input terminal of the comparator 104. That is, when the level of the output voltage VOUT is low, a larger current is caused to flow through the switch 107 or the coil 109 to thereby invert the level of the output signal of the comparator 104. The output signal of the comparator 104 is inputted to a reset terminal R of an SR-latch 106.

The oscillator 105 is operatively connected to a set terminal S of the SR-latch 106. Then, pulses having a fixed period, as shown in the figure, are outputted from the oscillator 105. An output terminal Q of the SR-latch 106 is operatively connected to the switch 107. Then, when a signal level at the output terminal Q of the SR-latch 106 goes H, the switch 107 is turned ON.

In the above-mentioned current mode step-down switching regulator, for example, a current caused to flow through the coil connected between the input terminal and an output terminal for the voltage may oscillate in some cases. In order to prevent this current oscillation, a slope correction becomes necessary. In order to suitably prevent the current oscillation, a suitable amount of slope correction needs to be carried out for a decreasing rate (slope) of a coil current.

However, when the output voltage VOUT of the current mode step-down switching regulator is made variable, in the conventional current mode step-down switching regulator shown in FIG. 3, there arises a problem in that a decreasing rate of the coil current of the coil 109 is changed as the output voltage VOUT is changed, whereas an amount of slope correction becomes unsuitable because an increasing rate (slope) of the correction ramp wave as an amount of slope correction outputted from the slope correcting circuit is fixed.

SUMMARY OF THE INVENTION

The present invention has been made in view of the above-mentioned circumstances and provides a switching regulator which is capable of changing an increasing rate of a correction ramp wave as an amount of slope correction outputted from a slope correcting circuit in accordance with an output voltage VOUT.

According to the present invention, there is provided a switching regulator, including: an input terminal through which an input voltage is inputted; an output terminal through which an output voltage is outputted; a coil connected between the input terminal and the output terminal; a slope correcting circuit for outputting a signal adapted to carry out slope correction for preventing current oscillation; an error amplifier for comparing one of the output voltage and a voltage division value of the output voltage with a reference voltage to output a signal; and a switch for controlling the output voltage with a signal generated using results obtained by arithmetically operating the output signal of the slope correcting circuit and the output signal of the error amplifier, the switching regulator being characterized in that the slope correcting circuit outputs a signal obtained by adjusting the signal adapted to carry out the slope correction in correspondence to the output voltage.

Also, according to the present invention, there is provided a switching regulator characterized in that the slope correcting circuit outputs a signal which is adjusted such that an increasing rate or a decreasing rate of the signal adapted to carry out the slope correction is proportional to a decreasing rate of a current caused to flow through the coil.

Also, according to the present invention, there is provided a switching regulator characterized in that the slope correcting circuit outputs a signal which is adjusted such that an increasing rate or a decreasing rate of the signal adapted to carry out the slope correction is proportional to the reference voltage.

Also, there is provided a slope correcting circuit for outputting a signal adapted to carry out slope correction for preventing current oscillation of a switching regulator, the slope correcting circuit including: an operational amplifier for comparing a voltage division value of a power supply voltage with a reference voltage to output a signal; a switch for receiving as its input the signal from the operational amplifier; a mirror circuit connected in series with the switch between a power supply and a ground electric potential; and a capacitor connected between the mirror circuit and the ground electric potential, the slope correcting circuit being characterized in that the slope correcting circuit outputs a voltage developed across the capacitor and the mirror circuit as the signal adapted to carry out the slope correction.

An increasing rate of a correction ramp wave as an amount of slope correction outputted from the slope correcting circuit is changed in accordance with a reference voltage VREF which is made to fluctuate for the purpose of changing an output voltage VOUT. Thus, the switching regulator can be structured so that even if the output voltage is changed, a proper amount of slope correction is kept.

DESCRIPTION OF THE PREFERRED EMBODIMENTS

Figure 1:
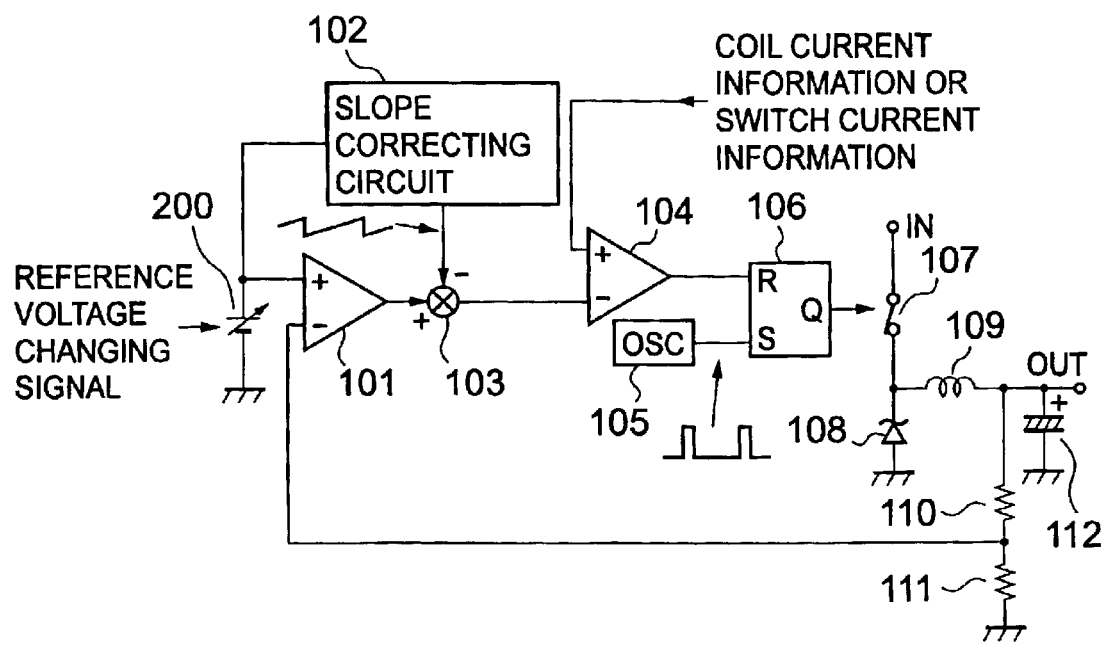
FIG. 1 is a block diagram of a current mode step-down switching regulator according to an embodiment of the present invention.

A preferred embodiment of the present invention will be hereinafter described in detail with reference to the accompanying drawings. FIG. 1 shows, as one example, a block diagram of a switching regulator according to an embodiment of the present invention.

A switch 107 serves to supply therethrough an input voltage VIN to a coil 109. An error amplifier 101 serves to amplify a difference between a voltage which is obtained by dividing an output voltage VOUT with a resistor 110 and a resistor 111, and a reference voltage VREF supplied from a reference voltage source 200.

A signal which is obtained by subtracting a correction ramp wave outputted from the slope correcting circuit 102 from an output signal of the error amplifier 101 in a subtracter 103 is inputted to an inverting input terminal of a comparator 104. The correction ramp wave outputted from the slope correcting circuit 102, as shown in the figure, has a shape of a saw-tooth-wave which is synchronous with a period of an oscillator 105.

A voltage signal into which information of a current caused to flow through the switch 107, or information of a current caused to flow through the coil 109 is converted is inputted to a non-inverting input terminal of the comparator 104. A currents caused to flow through the respective constituent elements is usually detected using a sense resistor which is operatively connected in series with the switch 107 or the coil 109. Thus, a voltage signal having a value which is proportional to the current caused to flow through the switch 107 or the coil 109 is inputted as voltage information to the non-inverting input terminal of the comparator 104.

An output signal of the comparator 104 is inputted to a reset terminal R of an SR-latch 106.

The oscillator 105 is operatively connected to a set terminal S of the SR-latch 106. Then, pulses having a fixed period, as shown in the figure, are outputted from the oscillator 105. An output terminal Q of the SR-latch 106 is operatively connected to the switch 107. Then, when a signal level at the output terminal Q of the SR-latch goes H, the switch 107 is turned ON.

Figure 3:
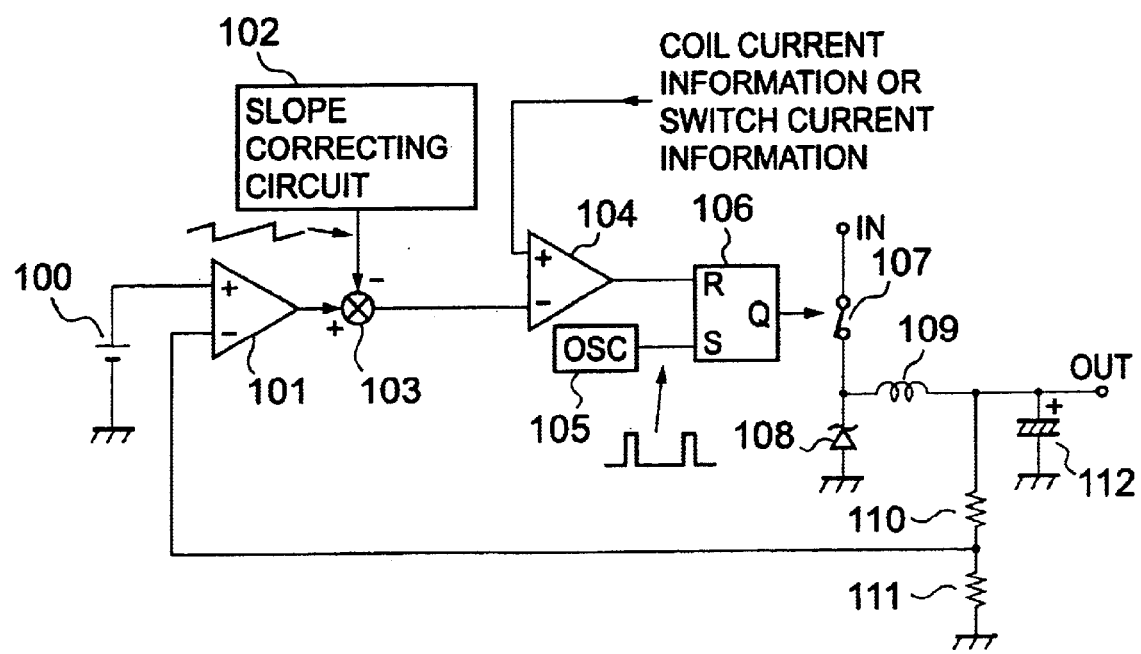
FIG. 3 is a block diagram of a conventional current mode step-down switching regulator.

As compared with the conventional current mode step-down switching regulator shown in FIG. 3, a reference voltage VREF of the reference voltage source 200 is changed to thereby make the output voltage VOUT variable. Moreover, the reference voltage VREF as an output voltage of the reference voltage source 200 is inputted to the slope correcting circuit so that an increasing rate of the correction ramp wave as an amount of slope correction is made variable in accordance with the reference voltage VREF.

That is, in order that an amount of slope correction of the switching regulator is suitably maintained even if the output voltage VOUT is changed, an increasing rate of the correction ramp wave as an amount of slope correction is changed so as to follow a fluctuation of a decreasing rate of a coil current generated by changing the output voltage VOUT.

Detailed description will be hereinbelow given with respect to a case where an increasing rate of the correction ramp wave as an amount of slope correction is changed in proportion to the reference voltage VREF.

For example, in case of the step-down switching regulator, assuming that an inductance of the coil 109 is L, an increasing rate (slope) MU of the coil current when the switch 107 is in a turn-ON state is approximately expressed as follows:

$$MU=(VIN-VOUT)/L. \quad \text{(Expression 1)}$$

On the other hand, a decreasing rate (slope) MD of the coil current when the switch 107 is in a turn-OFF state is approximately expressed as follows:

$$MD=VOUT/L. \quad \text{(Expression 2)}$$

In particular, a current oscillation of the current mode step-down switching regulator has no connection with the increasing rate MU of the coil current, and hence it is sufficient to take into account only the decreasing rate MD of the coil current. Thus, only the decreasing rate of the coil current will be hereinbelow described.

Assuming that the reference voltage as the output voltage of the reference voltage source 100 is VREF, and resistance values of the resistors 110 and 111 are R110 and R111, respectively, the output voltage VOUT is expressed as follows:

$$VOUT=(1+R110/R111) \times VREF. \quad \text{(Expression 3)}$$

Hence, if Expression 3 is substituted for Expression 2, then the following Expression is obtained:

$$MD=(1+R110/R111) \times VREF/L. \quad \text{(Expression 4)}$$

On the other hand, assuming that the increasing rate (slope) MC of the correction ramp wave as an amount of slope correction outputted from the slope correcting circuit is expressed as follows so as to be proportional to the reference voltage VREF, $$MC=K \times VREF \quad \text{(Expression 5)}$$

where K is a proportional constant, the following Expression is obtained from Expression 4 and Expression 5:

$$MC/MD=K \times L/(1+R110/R111). \quad \text{(Expression 6)}$$

From Expression 6, it is understood that a ratio of the increasing rate MC of the correction ramp wave as an amount of slope correction to the decreasing rate MD of the coil current becomes fixed.

From the foregoing, the increasing rate MC of the correction ramp wave as an amount of slope correction is made proportional to the reference voltage VREF which is made to fluctuate for the purpose of changing the output voltage VOUT, whereby the ratio of the increasing rate MC of the correction ramp wave as an amount of slope correction to the decreasing rate MD of the coil current can be made fixed against the output voltage VOUT. As a result, it is possible to constitute the current mode step-down switching regulator with which a suitable amount of slope correction is maintained against the output voltage VOUT.

The detailed description has been given above with respect to the case where the increasing rate of the correction ramp wave as an amount of slope correction is changed in proportion to the reference voltage VREF. However, even if a change in increasing rate MD of the correction ramp wave as an amount of slope correction is not necessarily proportional to the reference voltage VREF, effects of the present invention are provided as long as a relationship between the correction ramp and the decreasing rate of the coil current shows a proportional relationship.

That is, in order to prevent the oscillation of the current mode step-down switching regulator, a value of the ratio of the increasing rate MC of the correction ramp wave as an amount of slope correction to the decreasing rate MD of the coil current becomes important.

In the embodiment shown in FIG. 1, the description has been given with respect to the case where the correction ramp wave is increased. However, even if a subtracter 103 is replaced with an adder such that the correction ramp wave is decreased, the same effects can be obtained. In this case, an amount of slope correction becomes a decreasing rate of the correction ramp wave.

As described above, even with the circuit configuration different from that in the embodiment shown in FIG. 1, the same effects as those in the circuit configuration of FIG. 1 of the present invention can be obtained.

Figure 2:
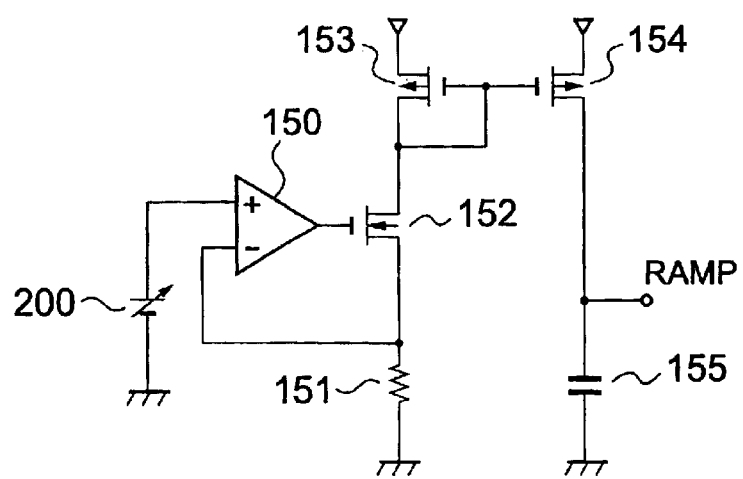
FIG. 2 is a block diagram of a slope correcting circuit for generating a correction ramp wave which is proportional to a change in a reference voltage VREF.

Next, a description will be hereinbelow given with respect to a concrete circuit configuration of the slope correcting circuit. FIG. 2 shows one example of a circuit for generating a correction ramp wave proportional to a change in reference voltage VREF.

In the figure, gate electrodes of transistors 153 and 154 constituting a mirror circuit are commonly connected to each other and also are operatively connected in parallel between a voltage source or the like and a ground electric potential. Both a voltage from the reference voltage source 200 and a voltage developed across a resistor 151 are inputted to an operational amplifier 150 which in turn outputs a signal to a gate electrode of a transistor 152. The transistor 154 and a capacitor 155 are operatively connected in series, and a correction ramp wave as a saw-tooth-wave is outputted through a node between the transistor 154 and the capacitor 155.

Here, assuming that an output voltage of the reference voltage source 200 is VREF, and a resistance value of the resistor 151 is R151, a current I151 caused to flow through the resistor 151 is expressed as follows:

$$I151 = VREF/R151. \quad \text{(Expression 7)}$$

If the P-channel enhancement type MOS transistors 153 and 154 are equal in size for the sake of simplicity, then a current I154 caused to flow through the P-channel enhancement type MOS transistor 154 becomes equal to the current I151 caused flow through the resistor 151.

That is, the following Expression is established:

$$I144 = VREF/R151. \quad \text{(Expression 8)}$$

Since this current is caused to flow into the capacitor 155, assuming that a capacitance value of the capacitor 155 is C151, an increasing rate MR of a terminal voltage VRAMP developed across opposite terminals of the capacitor 155 is expressed as follows:

$$MR = I154/C155 = VREF/R151/C155. \quad \text{(Expression 9)}$$

Since both the resistance value R151 of the resistor 151 and the capacitance value C155 of the capacitor 155 are fixed values, Expression 9 shows that the increasing rate MR of the terminal voltage VRAMP developed across the opposite terminals of the capacitor 155 is proportional to the reference voltage VREF.

In other words, if the terminal voltage VRAMP of the capacitor 155 is utilized for the correction ramp wave, then the correction ramp wave proportional to a change in reference voltage VREF can be obtained. It should be noted that in any other circuit configuration as well, it is possible to obtain the same effects as those in the circuit configuration shown in FIG. 2. Thus, the present invention does not refer only to the circuit configuration shown in FIG. 2.

As set forth hereinabove, according to the present invention, in order to change the output voltage VOUT, the reference voltage VREF is made variable, and at the same time, the increasing rate of the correction ramp wave as an amount of slope correction outputted from the slope correcting circuit is also made variable so as to be proportional thereto. Consequently, it is possible to constitute the switching regulator in which even if the output voltage VOUT is changed, a suitable amount of slope correction is maintained.

What is claimed is:

1. A switching regulator, comprising:

an input terminal through which an input voltage is inputted;

an output terminal through which an output voltage is outputted;

a coil connected between the input terminal and the output terminal;

a slope correcting circuit for outputting a signal adapted to carry out slope correction for preventing current oscillation;

an error amplifier for comparing one of the output voltage and a voltage division value of the output voltage with a reference voltage to output a signal; and a switch for controlling the output voltage with a signal generated using results obtained by arithmetically operating the output signal of the slope correcting circuit and the output signal of the error amplifier, wherein the slope correcting circuit outputs a signal obtained by adjusting the signal adapted to carry out the slope correction in correspondence to the output voltage.

2. A switching regulator according to claim 1, wherein the slope correcting circuit outputs a signal which is adjusted such that an increasing rate or a decreasing rate of the signal adapted to carry out the slope correction is proportional to a decreasing rate of a current caused to flow through the coil.

3. A switching regulator according to claim 1, wherein the slope correcting circuit outputs a signal which is adjusted such that an increasing rate or a decreasing rate of the signal adapted to carry out the slope correction is proportional to the reference voltage.

4. A slope correcting circuit for outputting a signal adapted to carry out slope correction for preventing current oscillation of a switching regulator, the slope correcting circuit comprising:

an operational amplifier for comparing a voltage division value of a power supply voltage with a reference voltage to output a signal;

a switch for receiving as its input the signal from the operational amplifier;

a mirror circuit connected in series with the switch between a power supply and a ground electric potential; and a capacitor connected between the mirror circuit and the ground electric potential, wherein the slope correcting circuit outputs a voltage developed across the capacitor and the mirror circuit as the signal adapted to carry out the slope correction.

* * * * *